(12) United States Patent
Nilsson

(10) Patent No.: US 11,476,715 B2
(45) Date of Patent: Oct. 18, 2022

(54) BOSON BEAM ENERSEND SYSTEM

(71) Applicant: Jack Nilsson, Strongsville, OH (US)

(72) Inventor: Jack Nilsson, Strongsville, OH (US)

( * ) Notice: Subject to any disclaimer, the term of this patent is extended or adjusted under 35 U.S.C. 154(b) by 389 days.

(21) Appl. No.: 16/658,964

(22) Filed: Oct. 21, 2019

(65) Prior Publication Data

US 2020/0127500 A1 Apr. 23, 2020

Related U.S. Application Data

(60) Provisional application No. 62/766,490, filed on Oct. 22, 2018.

(51) Int. Cl.
*H02J 50/27* (2016.01)
*H04B 5/00* (2006.01)
*H02J 7/02* (2016.01)

(52) U.S. Cl.
CPC .............. *H02J 50/27* (2016.02); *H02J 7/025* (2013.01); *H04B 5/0037* (2013.01)

(58) Field of Classification Search
CPC . H02J 50/27; H02J 7/025; H02J 50/23; H04B 5/0037
See application file for complete search history.

(56) References Cited

U.S. PATENT DOCUMENTS

| | | | | |
|---|---|---|---|---|
| 8,594,572 B1* | 11/2013 | Ortiz | ............... | H02J 50/50 455/41.2 |
| 2012/0007435 A1* | 1/2012 | Sada | ............... | H02J 50/12 307/84 |
| 2012/0086281 A1* | 4/2012 | Kanno | ............... | H01Q 7/00 307/82 |
| 2012/0086283 A1* | 4/2012 | Yamamoto | ............... | H02J 50/40 307/104 |
| 2019/0044606 A1* | 2/2019 | Mansikkamaki | ...... | H04B 7/145 |

* cited by examiner

*Primary Examiner* — Daniel Cavallari
*Assistant Examiner* — Brian K Baxter

(57) ABSTRACT

Systems and methods are presented for wireless energy transfer by scalar-longitudinal electromagnetic propagating waves. The scalar wave beam antenna is further enhanced with additional active and parasitic resonant elements for increasing the penetrating and far field distance transfer of energy. A receiving antenna module is designed for effective capture of longitudinal and transverse waves. Presented are uses for this system to illuminate areas without the need for wires, powering electronic devices, charging batteries remotely, new style communications, and military applications.

14 Claims, 15 Drawing Sheets

BOSON BEAM ENERSEND SYSTEM

CROSS REFERENCE TO RELATED APPLICATION

This application claims priority from U.S. Provisional Application Ser. No. 62/766,490 filed Oct. 22, 2018; the disclosure of which is incorporated herein by reference. [Included therein are demonstration photos.]

BACKGROUND OF THE INVENTION

1. Field of Invention

The current invention relates to apparatus, systems, and methods for transmission of electromagnetic energy at far-field distances through the air and penetrating through objects and medium by a scalar electromagnetic wave propagation beam transmitting antenna and receiving antenna, unlike electromagnetic propagation transverse waves, electromagnetic induction, and magnetic resonant coupling systems. Propagating photons, gauge bosons, in along axis alternating polarity is realized.

2. Description of Related Art

One of the dreams and desires of mankind has been effective and efficient true wireless energy. Where all the energy is through the air and space. No wire, no earth ground return to complete the circuit.

There have been limited successes using radio frequencies electromagnetic energy transfer and such a method has been inefficient requiring charging of batteries over time at the receiving end to generate sufficient power to operate even low power consumption devices. Such a method utilizes the standard known transverse radio frequency wave and has had little success in penetrating objects and walls.

As a result, some have turned away from radio frequency electromagnetic waves to ultrasonic waves and infrared light. Such methods have some concerns and have no object and wall penetrating abilities. Such methods require media converter circuitry.

And inductive and capacitive coupling methods are functional over only very short distances such as inches.

BRIEF SUMMARY OF THE INVENTION

Disclosed here is breakthrough wireless energy. Scalar/longitudinal electromagnetic waves have been theorized by Nikola Tesla but its realization has never occurred.

This invention is of generating substantial radio frequency electromagnetic scalar waves for transmitting the energy through objects including walls, liquids, and metals. This is accomplished by center axis focused 180 degree out of phase collinear transverse waves summating to axial longitudinal, scalar waves. In one method a parabolic reflector is used with an axially positioned feed element such that the reflected transverse waves are of such a nature. The scalar wave, unlike standard transverse waves, is seen to penetrate objects including metals and liquid.

The penetrating longitudinal wave is similarly enhanced after passing through an object in its path by transverse waves also generated by the apparatus diffracting around the object.

In another configuration of this invention the feed element within the parabolic reflector is supplemented by a loop style co-fed element which generates electromagnetic waves inducing active resonance in suspended rings (loops), resulting in further focused and concentrated electromagnetic radio frequency fields enhancing all effects. This configuration is an enhanced scalar wave beam, and there is overall increased penetrating effects and synergy of the longitudinal wave penetrating through an object and wall, enhancing the dampened transverse wave that less effectively traversed the object and wall.

In one application this transferred energy is converted directly to light such as with a light emitting diode at a scalar wave receiving antenna.

In other configurations the electrical power generated at the scalar wave receiving antenna is used to directly power electronic devices including soap dispensers, radios, cell phones, cordless phones, headphones and headsets, hand tools, toys, medical equipment, office equipment, remote systems, emergency and back-up systems, security systems, sensors, and outdoor lighting.

In another configuration the transferred energy is used to charge batteries independently and as part of, embedded in electronic devices.

High power piercing energy beam military applications are made possible.

In another configuration the radio frequency generated and received may also be used for powerful penetrating analog and digital communications links. There are numerous implementations including in-building WiFi, WMAN (Wireless Metropolitan Access Network), WWAN (Wireless Wide Access Network), wireless cameras, Bluetooth, Bluetooth Low Energy, broadcast communication, point-to-point wireless, cellular systems, earth surface to underground detection and communication, VHF and UHF and microwave and all frequencies systems including wave propagation through layers of the atmosphere, spacecraft and space communications.

The scalar wave parabolic beam antenna may also be used at the receiving end.

Further uses of this science and technology include medical imaging and cancer therapy innovations.

BRIEF DESCRIPTION OF DRAWINGS

One or more preferred embodiments that illustrate the best mode(s) are set forth in the drawings and in the following description. The claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION OF THE INVENTION

Humans utilize energy for a multitude of things. And electrical energy delivery has historically been tied to wires. More recent developments allow transfer of energy without wired connection but only over short distances, and not through walls and objects.

Herein is the solution so desired by mankind, a method for sending and receiving energy across large distances and through walls and objects effectively and efficiently for a vast number of uses such as lighting, powering electronic devices directly, charging batteries, communications, and energy transfer for military applications; all these things on earth as well as in space and elsewhere.

To accomplish the above profoundly, the scalar wave beam antenna with its scalar/longitudinal wave needed to be invented and preferably enhanced in penetrating and energy over distance capabilities with a loop design added to the axial feed, and rings ('suspended' resonant loops) with the active and parasitic interactions resulting in high gain for size and diverse longitudinal and transverse waves, where the transverse waves enhance the scalar wave in diffracting around objects, and penetrating scalar waves enhance transverse waves more diminished in strength after traversing obstructions and walls.

Figure 1:
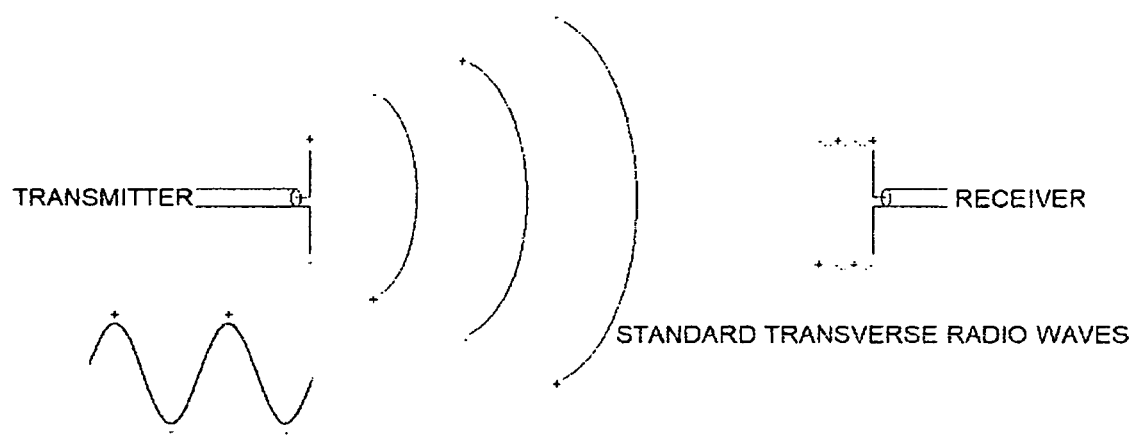
FIG. 1 is a prior art illustration of standard transverse radio waves.
Figure 2:
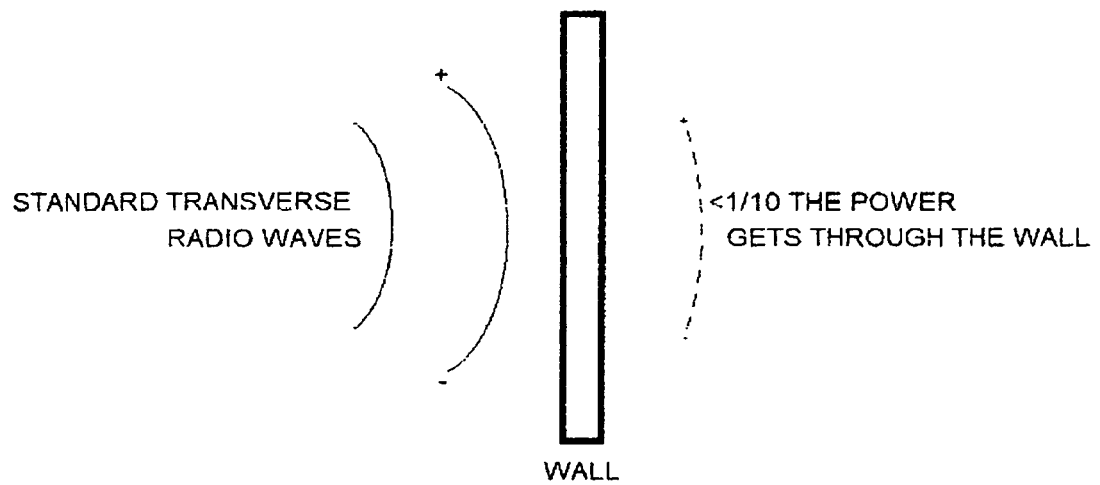
FIG. 2 illustrates the substantial reduction in power with transverse radio waves by wall structures.

FIG. 1 illustrates the standard transverse wave and FIG. 2 the substantial attenuation of the standard transverse wave through objects and walls.

Figure 3:
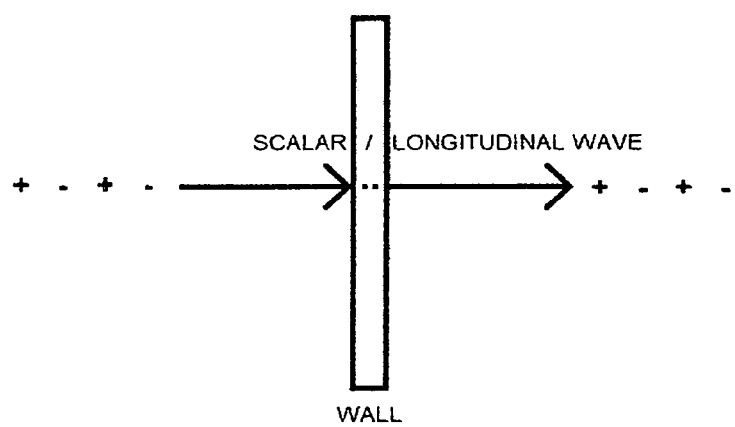
FIG. 3 illustrates the scalar/longitudinal wave penetrating through wall-like structures.
Figure 4:
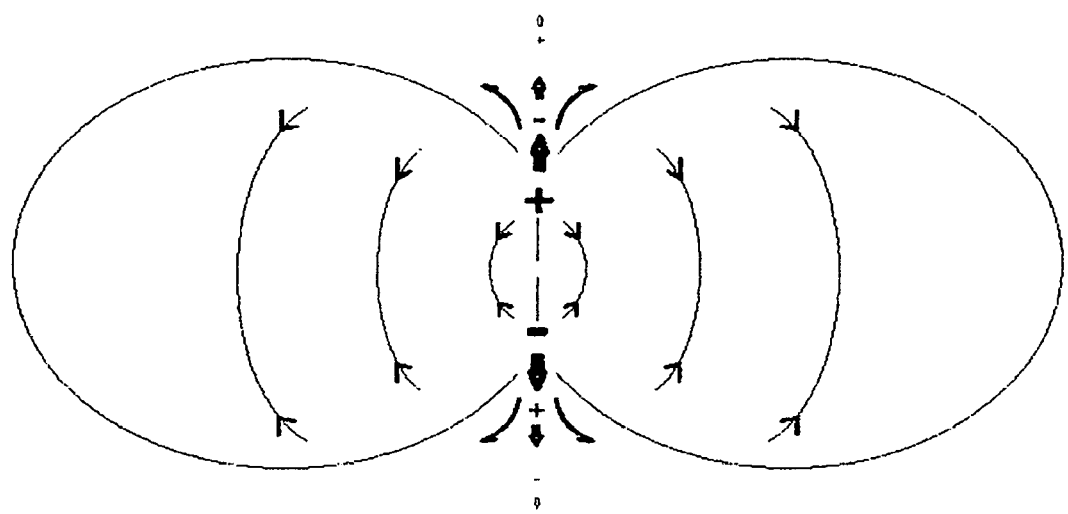
FIG. 4 illustrates the diminutive scalar/longitudinal wave of standard antennas, due to their self-dissipating nature on the scalar/longitudinal wave component.

FIG. 3 shows the anticipated penetrating properties of the longitudinal/scalar wave. Although there is the near field 'immediacy' of longitudinal waves from the high voltage point tip of a monopole and dipoles actively fed with radio frequency power, there is a dramatic degradation of that scalar energy component as the near and far fields of transverse waves are generated, as illustrated in FIG. 4.

Figure 5A:
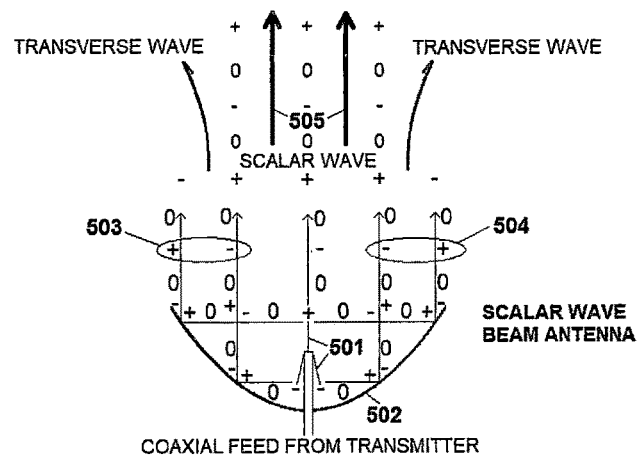
FIG. 5 illustrates a means for generating scalar/longitudinal waves using a parabolic reflector with an axially positioned feed element where center axis focused 180 degrees out of phase collinear transverse waves summate to axial and near-axial longitudinal longitudinal/scalar waves.
Figure 5B:
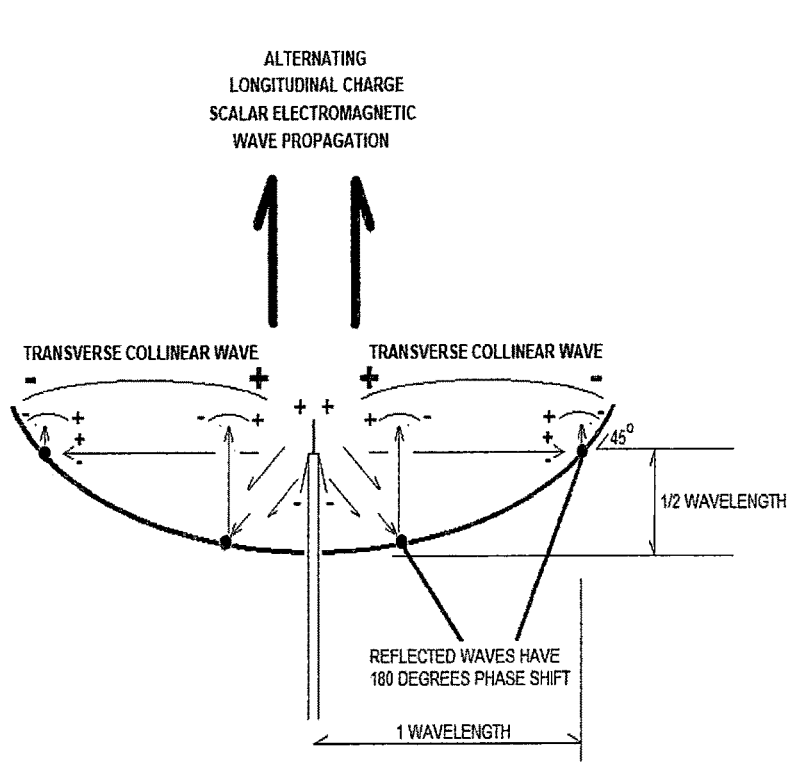
Figure 5C:
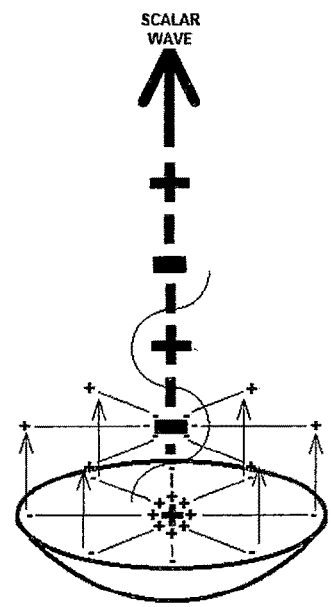

Longitudinal waves are generated with a reflector illustrated in FIG. 5A with a single active element 501 and a parabolic reflector 502. The transverse waves generated by the axial element 501 propagate laterally toward the parabolic reflector inner walls and become collinear indicated by 503 and 504 and are 180 degrees out of phase, with the central near-axis components of these transverse waves being of the same polarity as the axial scalar wave in FIG. 5A which further illustrates this (near) axial summating of same polarities, producing a focused scalar wave 505; FIG. 5B a preferred example; FIG. 5C a dimensional view.

Figure 6:
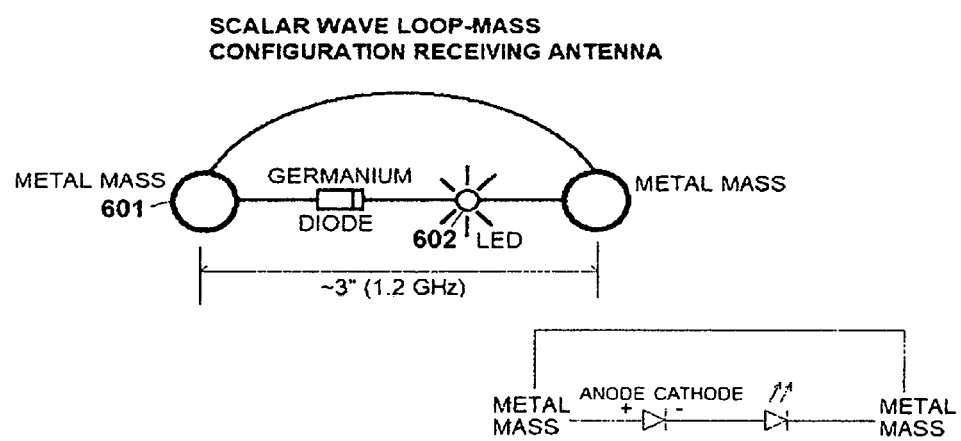
FIG. 6 illustrates a scalar wave receiver antenna, represented here at 1.2 GHz.

FIG. 6 illustrates a scalar wave receiving antenna which is tuned by dimensions to resonance at the transmitted energy frequency, effective in receiving transverse electromagnetic waves, and the summation of same-polarity components of transverse and longitudinal waves by nature of its geometric construct and particularly with its metal mass components 601 positioned somewhat laterally to the central axis scalar wave. The scalar wave receiving antenna with generated current and voltage can be used in producing light with an LED (Light Emitting Diode) 602 in circuit shown in FIG. 6 and to power electronic devices directly and to charge batteries.

Figure 7:
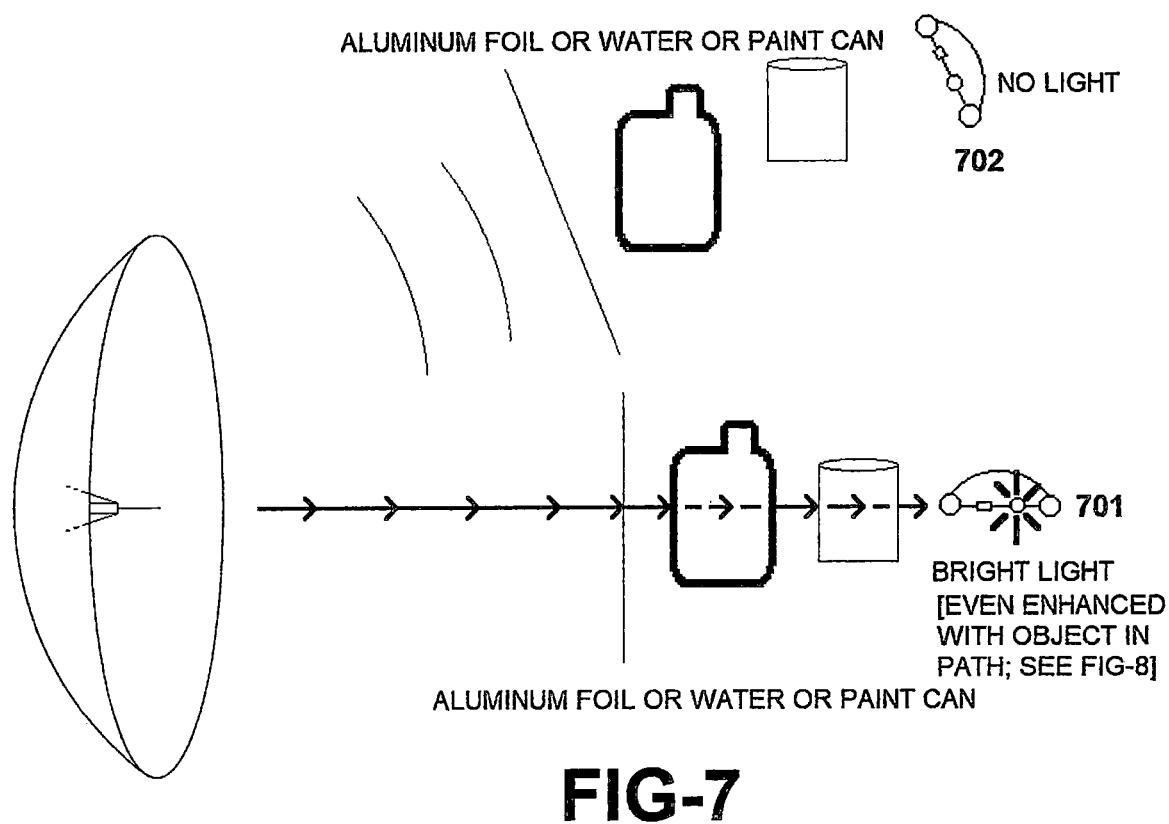
FIG. 7 illustrates dramatic attenuation of the transverse wave by metals and liquids, and pass-through penetration of these objects and materials by the longitudinal/scalar wave.

Penetration of objects and metals and liquids by the longitudinal waves illustrated by 701 in FIG. 7 and substantial attenuation of the transverse waves illustrated by 702.

Figure 8:
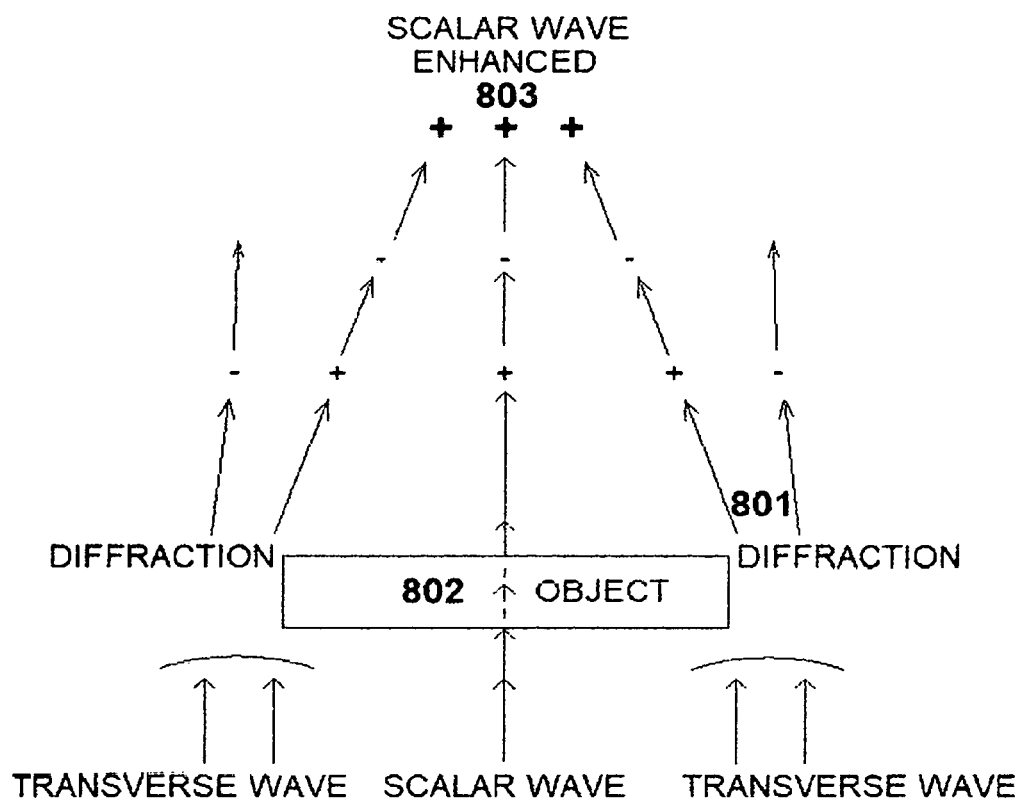
FIG. 8 illustrates enhancement of the scalar wave by transverse waves diffracting around the object in the propagation path.

Mutually supportive scalar and transverse waves are shown by illustration in FIG. 8 with diffraction of the transverse wave 801 around the object 802 in the path of the signal from the scalar wave beam transmitter of FIG. 5, and by illustration in FIG. 8 showing by summation of like-polarities the enhanced scalar wave 803.

Figure 9:
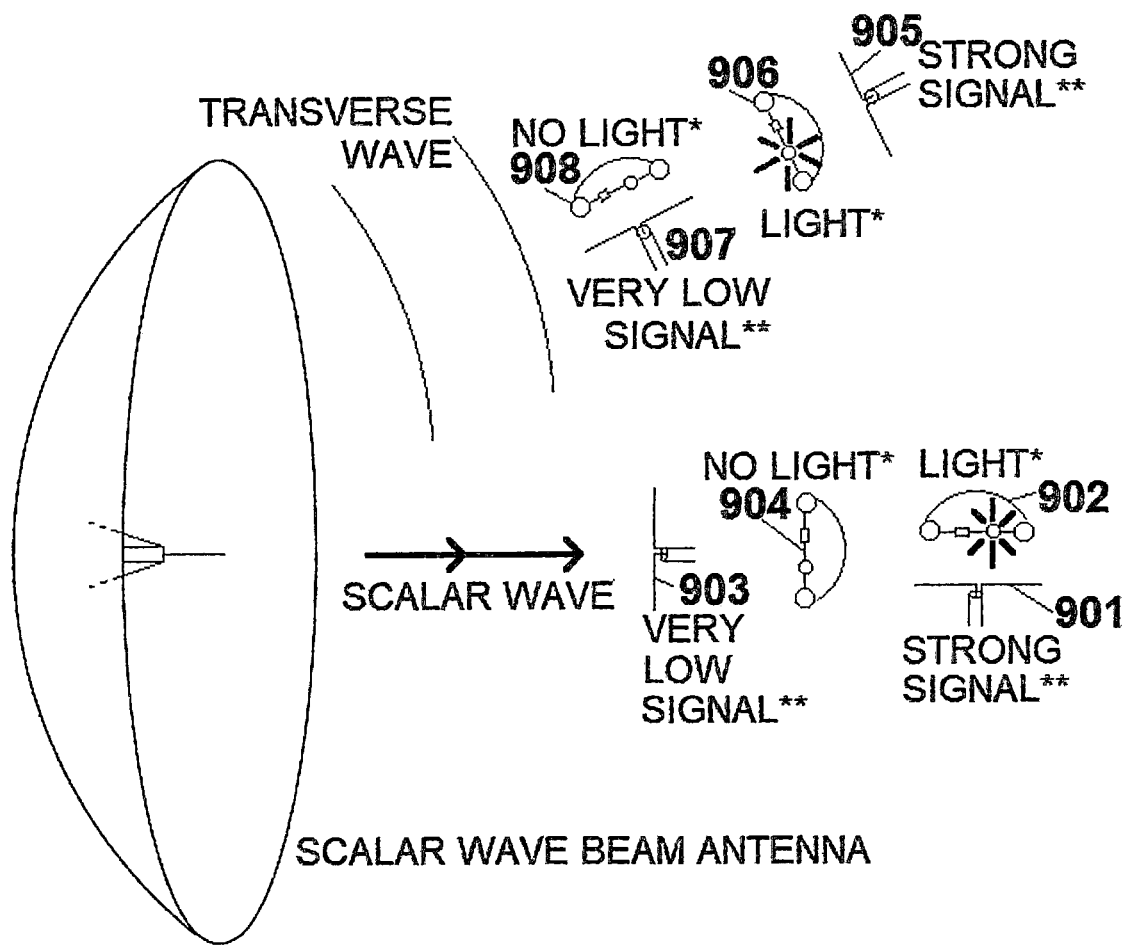
FIG. 9 illustrates substantiating the central axial longitudinal wave showing reception by axially oriented antenna receivers and substantially reduced reception by orthogonally positioned transverse wave antenna receivers, whereas the sideward transverse wave has reception by orthogonally positioned transverse antenna receivers and substantially reduced reception by axially oriented antenna receivers.

Substantiating the lack of transverse waves in the central axis radio frequency propagation pattern of the scalar wave beam and lack of longitudinal waves in the sideward propagation pattern, FIG. 9 illustrates the strong signal and light of the axial positioned receivers 901 and 902 in the central forward path of the scalar wave beam and low signal 903 and no light 904 with the transverse positioned receivers in that path, and strong signal and light with transverse positioned receivers 905 and 906 in the sideward path and low signal and no light with axial oriented receivers 907 and 908 in that propagation path.

Figure 10:
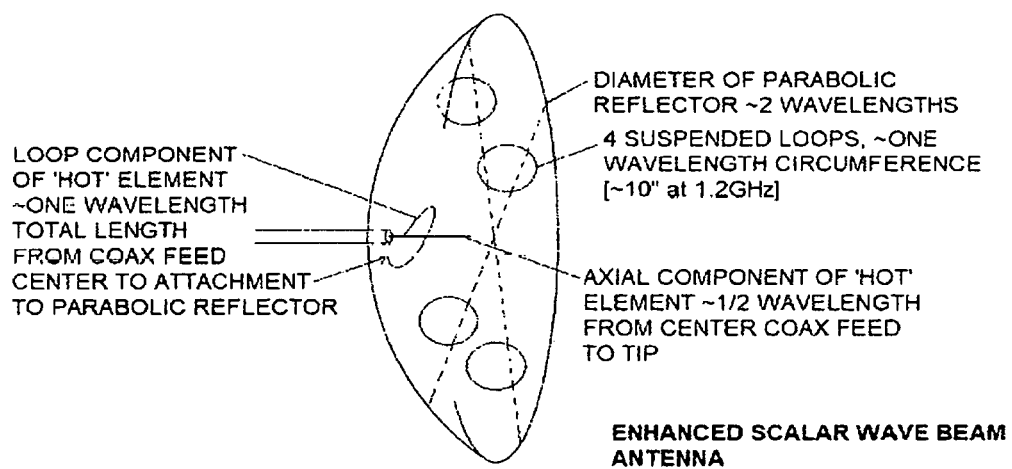
FIG. 10 illustrates the scalar wave beam antenna used also as a receiver.

Progressing to the enhanced scalar wave beam antenna adaptation for further enhancing penetrating and distance transfer of energy, FIG. 10 illustrates enhancing loop components and dimensions.

Figure 11:
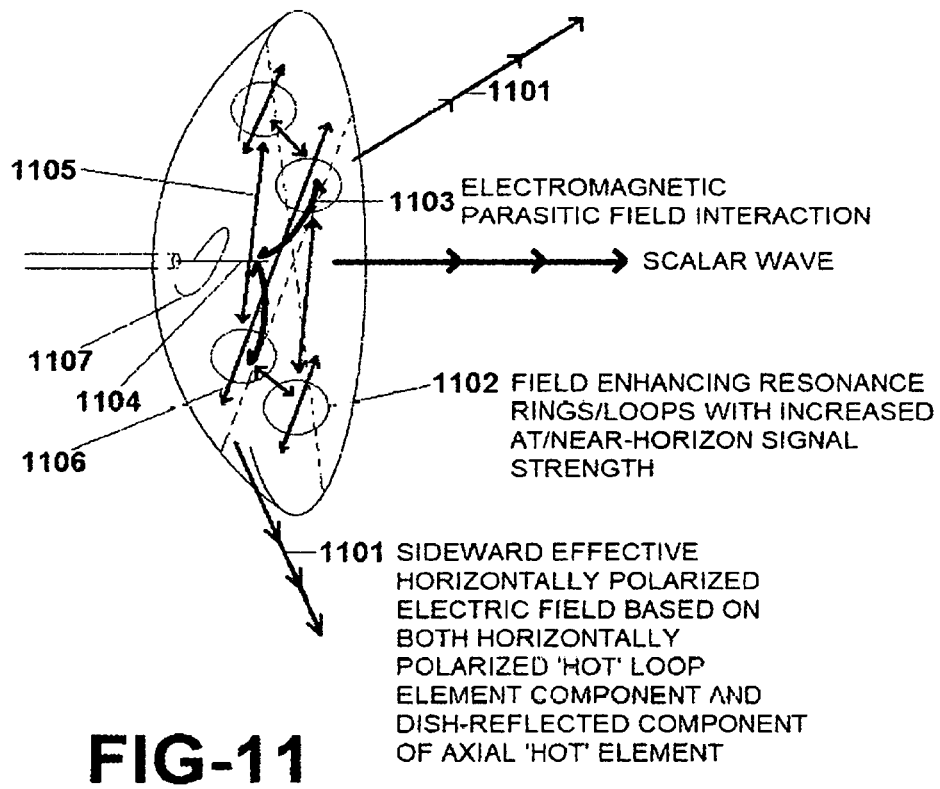
FIG. 11 illustrates the electromagnetic interacting fields of the enhanced scalar wave beam antenna.
Figure 12:
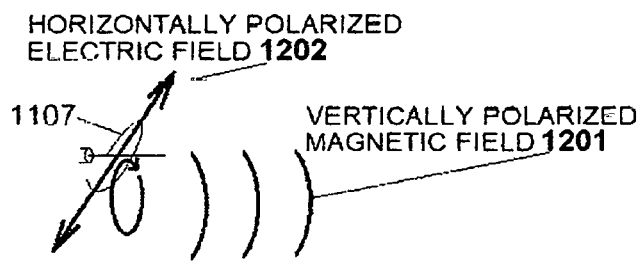
FIG. 12 illustrates particularly the electromagnetic field components generated by the loop component of the feed element.

FIG. 11 and FIG. 12 illustrate the loop design 1107 add-on to the axial active element with near field magnetic 1201 and electric 1202 radio frequency field components. FIG. 11 illustrates the total transverse horizontally polarized electric far field 1101 that is generated by a combination of the 'hot' loop feed segment 1107 of FIG. 11 and FIG. 12, and reflected transverse waves produced to the sides 1003 of the axial 'hot' element segment. FIG. 11 further illustrates the field enhancing resonant rings ('suspended' loops) 1102 having electromagnetic 1103 parasitic interaction particularly with the axial segment of the feed element 1104, parasitic electromagnetic interaction between rings 1105, and increased at the horizon and near the horizon field signal strengths 1106.

Figure 14:
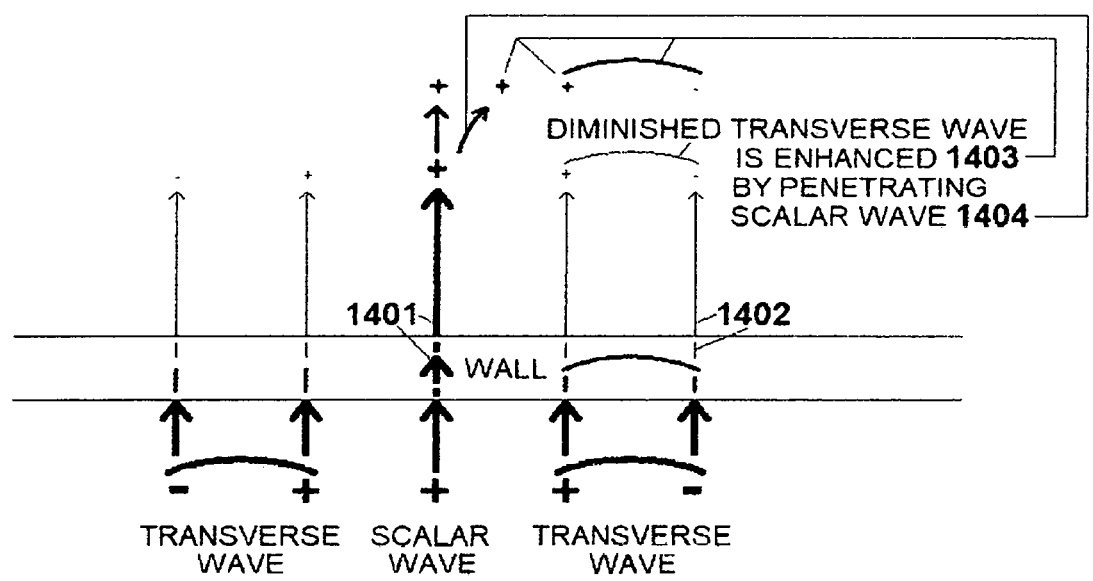
FIG. 14 illustrates the scalar wave effectively penetrating a wall enhancing the diminished transverse wave that poorly penetrated the wall.

The scalar wave component of the energy field of the enhanced scalar wave beam antenna penetrates objects and walls well 1401 as illustrated in FIG. 14; the transverse wave component penetrates poorly 1402, and residual transverse wave components are then enhanced 1403 by penetrating same-polarity scalar wave 1404.

Figure 13:
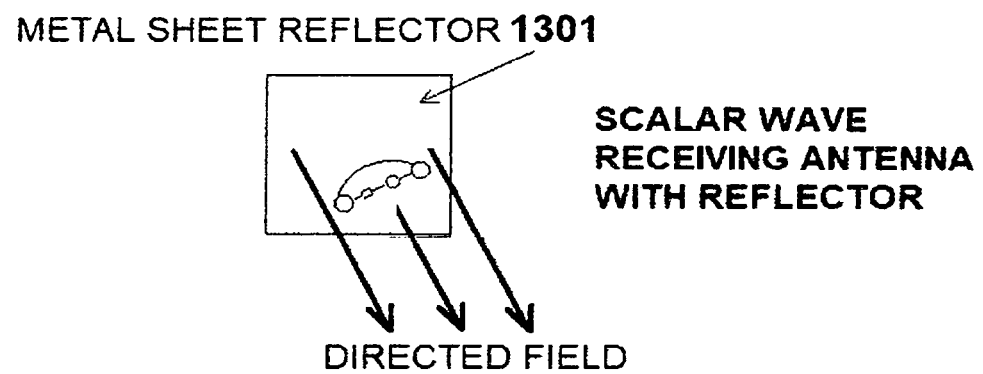
FIG. 13 illustrates the scalar wave receiving antenna with a metal sheet reflector.

FIG. 13 illustrates the ability to enhance penetrating and distance energy transfer capabilities with a metal reflector 1301 supplementing the scalar wave receiving antenna with directivity.

Figure 15:
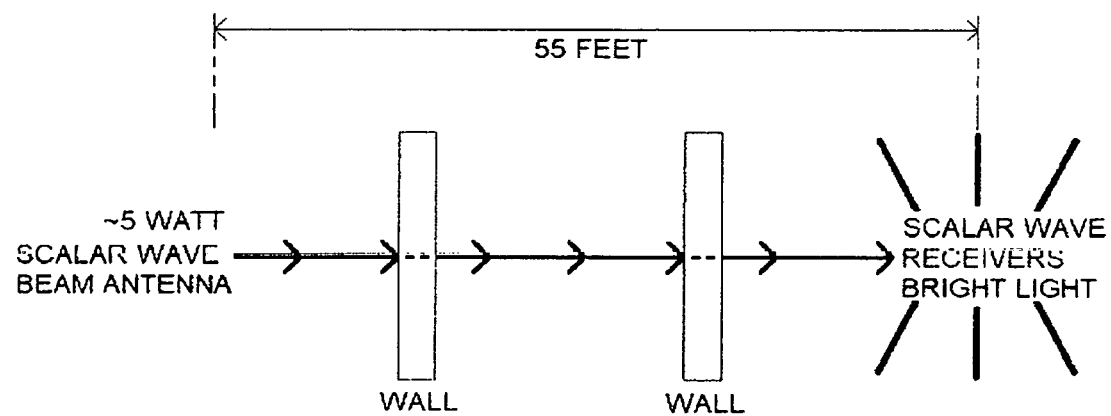
FIG. 15 illustrates efficient transfer of energy through walls of a building producing bright light at the scalar wave receiving antenna ~55 feet away from the scalar wave transmitting beam antenna fed with only ~5 watts.

The effective penetrating transfer of energy at distances is efficient and substantial and novel to mankind. FIG. 15 illustrates bright light generated passing energy through walls to 'ENERSEND RECEIVERS' with LED's ~55 feet away, where the transmitter is of only ~5 watts of power. The light produced at the scalar wave beam receiver at substantially 55 feet with a total of 40 LED's where each LED is producing ~5 lumens, for a total of ~200 lumens, is substantially equal to the light generated by a 7-watt incandescent light bulb.

Figure 16:
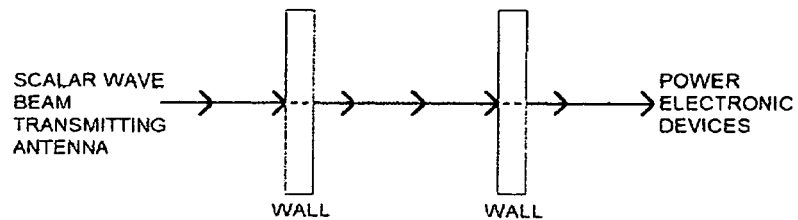
FIG. 16 illustrates the scalar wave beam antenna sending energy to distances through walls to power electronic devices.

With this new ability to transfer energy through the air, through space, through objects, a number of applications exist including powering electronic devices directly as illustrated in FIG. 16, including soap dispensers, radios, cell phones, cordless phones, headphones and headsets, hand tools, toys, medical equipment, office equipment, remote systems, emergency and back-up systems, security systems, sensors.

Figure 17:
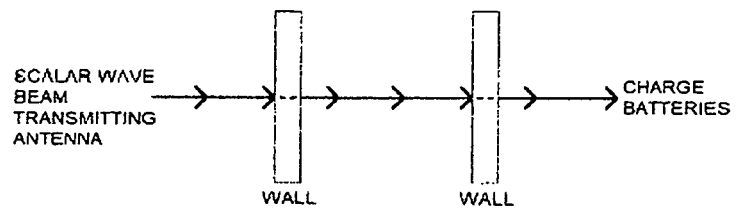
FIG. 17 illustrates the scalar wave beam antenna sending energy to distances through walls to charge batteries.

The transferred energy may also be used to charge batteries remotely as illustrated in FIG. 17.

Figure 18:
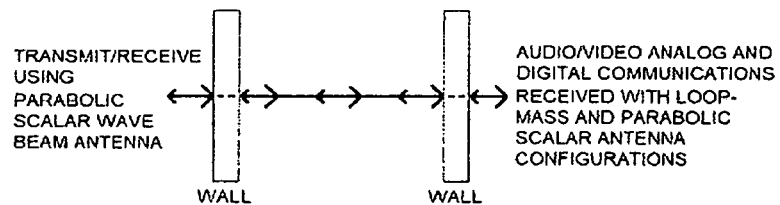
FIG. 18 illustrates use of this science and technology for penetrating and distance communications.

And new horizons in penetrating and distance communications is now realized as illustrated in FIG. 18.

Figure 19:
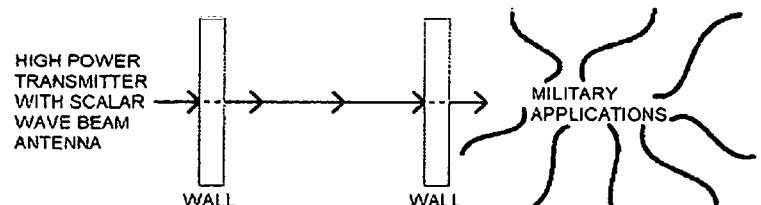
FIG. 19 illustrates high power military use of this science and technology penetrating substantial wall (like) structures.

FIG. 19 illustrates military applications particularly using high transmitted power resulting in substantial penetrating energy levels through substantial objects and walls.

What is claimed is:

1. A system comprising:
    a scalar wave beam antenna configured to transfer wireless energy through objects and walls, and at far-field distances, by a scalar electromagnetic propagating wave, not comprising electromagnetic propagation transverse waves, electromagnetic induction, and magnetic resonance coupling systems;
    wherein the scalar wave beam antenna comprises an omnidirectional signal antenna, connected to a radio frequency transmitter configured to radiate transverse electromagnetic propagating waves parallel to omnidirectional signal antenna axis, with an axis in line with an axis of a parabolic reflector, at a focal point of the parabolic reflector;
    wherein the scalar wave beam antenna is further configured to reflect the transverse electromagnetic propagating waves by the parabolic reflector with 180 degrees phase shift and then projected forward as transverse electromagnetic propagating waves now in a plane orthogonal to the axis of the parabolic reflector and in an axially spoke-like configuration around a central parabolic reflector axis; and
    wherein transverse electromagnetic propagating waves is comprised of collinear in-phase reflected transverse wave components all with a same polarity at an end of the axis of the parabolic reflector and the same polarity and an opposite polarity at an outer end of the transverse wave components, creating a focused central axial scalar forward propagating wave.

2. The system of claim 1 wherein in a preferred configuration the parabolic reflector is two wavelengths at an operating frequency in diameter in the plane orthogonal to the axis of the parabolic reflector and through the focal point of the parabolic reflector, and one-half wavelength deep from the focal point of the parabolic reflector.

3. The system of claim 1 wherein a focal point radiator is a half wave type, with an outward projecting element being of a quarter wavelength wire, and an inward projecting element a cone with a one quarter wavelength side wall.

4. The system of claim 1 wherein a focal point radiator is a half wave dipole type, with an outward projecting element and inward projecting element both being of a quarter wavelength wire.

5. The system of claim 1 wherein a focal point radiator is a half wave dipole type, with an outward projecting element and inward projecting element both being of sheets of conductive material and of various 3-dimensional forms.

6. The system of claim 1 wherein a focal point radiator has a first end and a second end such that the first end is along the axis and away from a base of the parabolic reflector, the second end is insulated from the base of the parabolic reflector and connected to a one lead of a two-lead feedline from the radio frequency transmitter, the other lead of the radio frequency transmitter is connected to the base of the parabolic reflector.

7. The system of claim 6 wherein a projecting from a base element of a focal point radiator has an additional element connected along it and which is connected at its other end to a base of the parabolic reflector.

8. The system of claim 1 further comprising a scalar wave beam antenna receiving antenna structure using metal mass components at opposing positions along a one resonant wavelength long wire loop antenna.

9. The system of claim 1 wherein the scalar wave beam antenna is configured as a receiver.

10. The system of claim 1 configured for lighting and powering electronic devices and charging batteries.

11. The system of claim 1 configured for radio communications on earth and in space.

12. The system of claim 1 configured for military applications piercing walls and objects with high power.

13. The system of claim 1 further comprising parasitic one wavelength resonant loop elements with a plane of the parasitic one wavelength resonant loop elements in a same plane as and surrounding a radiative and axially positioned feed point antenna for enhancing a beam.

14. The system of claim 1 configured as a transmitting antenna and a receiving antenna.

* * * * *